United States Patent
Komatsu et al.

[15] 3,669,943
[45] June 13, 1972

[54] PROCESS FOR PRODUCING CONJUGATED DIOLEFIN POLYMER WITH REDUCED COLD FLOW

[72] Inventors: Koei Komatsu, Yokohama; Eitaro Okuya, Yokkaichi; Katsuyoshi Tomioka, Yokohama; Masato Sakai, Yokkaichi; Shigeki Hayashi, Yokkaichi; Hidetoshi Yasunaga, Yokkaichi; Akira Kogure, Tokyo, all of Japan

[73] Assignee: Japan Synthetic Rubber Co., Ltd., Chuo-ku, Tokyo, Japan

[22] Filed: May 28, 1970

[21] Appl. No.: 41,619

[30] Foreign Application Priority Data

May 31, 1969 Japan..................................44/41719

[52] U.S. Cl..........................260/80.7, 260/82.1, 260/83.7, 260/84.3, 260/84.7, 260/94.2, 260/94.4, 260/94.6
[51] Int. Cl.....................C08d 1/32, C08f 19/08, C08f 1/28
[58] Field of Search..............260/83.7, 94.2 M, 94.2 T, 82.1, 260/80.7

[56] References Cited

UNITED STATES PATENTS

| | | | |
|---|---|---|---|
| 3,592,799 | 7/1971 | Rouzier | 260/94.2 M |
| 3,119,800 | 1/1964 | Moss et al. | 260/94.2 |
| 3,318,862 | 5/1967 | Hinton | 260/94.2 |
| 3,350,380 | 10/1967 | Strobel | 260/94.2 |
| 3,393,182 | 7/1968 | Trepka | 260/94.2 |

FOREIGN PATENTS OR APPLICATIONS

| | | | |
|---|---|---|---|
| 943,939 | 12/1963 | Great Britain | 260/94.2 |
| 339,243 | 12/1930 | Great Britain | 260/94.2 |

*Primary Examiner*—James A. Seidleck
*Attorney*—Waters, Roditi, Schwartz & Nissen

[57] ABSTRACT

A process for producing a homopolymer or copolymer of a conjugated diolefin by polymerizing a conjugated diolefin alone or copolymerizing a conjugated diolefin with a vinyl aromatic hydrocarbon in the presence of a lithium-type initiator in a hydrocarbon solvent, characterized in that the quantity of said initiator required for the polymerization is divided into two portions, A and B, in a molar ratio of $A : B = 1 : 3$ to $15$, and said portion A is added at the outset to initiate the polymerization, and when the conversion to polymer has reached 20 to 60 percent by weight said portion B is added to the polymerization system to carry out the polymerization until it is substantially completed. The polymer obtained by the present process retains the desirable properties which a conventional conjugated diolefin polymer has, and is, in addition, characterized by reduced cold flow.

13 Claims, No Drawings

PROCESS FOR PRODUCING CONJUGATED DIOLEFIN POLYMER WITH REDUCED COLD FLOW

This invention relates to a process for producing a homopolymer or copolymer of a conjugated diolefin having reduced cold flow. More particularly, this invention relates to a process for producing a rubber-like polymer with reduced cold flow by polymerizing a conjugated diolefin alone or in admixture with a vinyl aromatic hydrocarbon in the presence of a lithium-type initiator.

The polymerization of conjugated diolefins alone or copolymerization thereof with vinyl aromatic hydrocarbons by use of a lithium-type initiator has recently become industrially important, and commercial products, such as "Cariflex," "Diene," "Duradene," "Solprene" and the like, are being produced and marketed.

These polymers generally possess excellent physical properties in addition to their low ash content and non-staining characteristics, and they have grown to occupy an important position in the synthetic rubber field, sharing the market with such polymers as cis-1,4-polybutadiene and cis-1,4-polyisoprene which are produced with a catalyst containing a transition metal.

However, when a monomer is contacted at a time with the entire quantity of a lithium-type initiator, the resulting polymer has a narrow molecular weight distribution which imparts to the polymer molecules a slipping tendency that will cause certain difficult problems concerning packaging, transportation and storage of the polymer.

Thus, the above-mentioned polymer in the unvulcanized state generally has a tendency to flow at about room temperature (i.e., cold flow). As a result, in case the packed products have been piled up for storage or transportation, a part of the package is liable to rupture, and once ruptured the rubber flows out of the package to become contaminated or the packages of rubber will stick together to cause a handling difficulty. Moreover, when the compounded stock of the polymer is shaped by extrusion or calendering, the resulting shaped articles will be deformed later. This is a fault of said polymer in practice.

Heretofore, in order to obtain a conjugated diolefin polymer with reduced cold flow, an inhibiting agent has specially been added.

As a result of extensive research, the present inventors have found that the above-mentioned object may be achieved without resorting to the addition of said inhibiting agent, by selecting a suitable method of adding the lithium-type initiator.

An object of the present invention is to provide a conjugated diolefin polymer with reduced cold flow.

Another object of the invention is to provide a novel process for producing such a polymer.

Other objects and effects of the invention will be apparent to those skilled in the art from the following description.

According to the present invention, there is provided a process for producing a homopolymer or a copolymer of conjugated diolefin by polymerizing a conjugated diolefin alone or in admixture with a vinyl aromatic hydrocarbon in the presence of a lithium-type initiator in a hydrocarbon solvent, characterized in that the quantity of said initiator required for the polymerization is divided into two portions, A and B, in a molar ratio of A : B = 1 : 3 to 15, and at first the portion A of the lithium-type initiator is added to the polymerization system to initiate the polymerization, and when the conversion reaches 20 to 60 percent by weight, the portion B of the lithium-type initiator is added to said system to effect polymerization until it is substantially completed.

As the conjugated diolefin used in the present invention, the preferred are 1,3-butadiene, isoprene, and piperylene.

Styrene, divinylbenzene, α-methylstyrene, β-methylstyrene, vinyltoluene, 1-vinylnaphthalene, and 2-vinylnaphthalene may be used as the vinyl aromatic hydrocarbon, styrene being most preferable.

Of the above-mentioned monomers, the most preferable monomers or combinations of monomers are butadiene, isoprene, butadiene-styrene, isoprene-styrene, butadiene-isoprene, and butadiene-isoprene-styrene.

As a hydrocarbon solvent, there may be used an aliphatic hydrocarbon, a cycloaliphatic hydrocarbon, and an aromatic hydrocarbon that are liquid under the polymerization conditions. Preferable hydrocarbon solvents are propane, n-pentane, isopentane, n-hexane, n-heptane, n-octane, isooctane, n-decane, cyclopentane, cyclohexane, methylcyclopentane, ethylcyclohexane, benzene, toluene, xylene, etc. The hydrocarbon solvent is preferably used in an amount of 1 to 20 parts by weight per part by weight of the monomer.

The lithium-type initiators used in the present process are metallic lithium: alkyllithiums, such as ethyllithium, propyllithium, n-butyllithium, sec.-butyllithium, tert.-butyllithium and isobutyllithium; aryllithiums, such as phenyllithium and tolyllithium; alkenyllithiums, such as vinyllithium and propenyllithium; alkylenedilithiums, such as tetramethylenedilithium and hexamethylenedilithium; arylenedilithiums, such as 1,3-dilithiobenzene and 1,4-dilithiobenzene; 1,3,5-trilithiocyclohexane; 1,2,5-trilithionaphthalene; 1,3,5,8-tetralithiodecane; 1,2,3,5-tetralithio-4-hexylanthracene, etc. These lithium-type initiators are added to the polymerization system in the form of a suspension or a solution in a hydrocarbon solvent which is preferably the same as the polymerization solvent.

Mainly, in the case of copolymerization of butadiene and styrene or the like, additives such as a so-called randomizer and a molecular weight regulator may suitably be used in combination with the above-mentioned lithium-type initiators.

As the main randomizers used in combination with the lithium compounds, the following may be illustrated:

(I) Ethers, thioethers, or tertiary amines [Japanese Pat. No. 290,238 (Publication No. 15,386/61)].

(II) 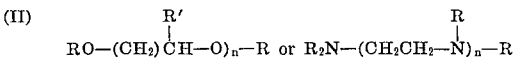

(Belgian Pat. No. 663, 879);

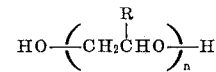

(Japanese Pat. Publication No. 12,146/71

(III) Anionic surface active agents having a hydrophilic group represented by —SO$_3$M or —OSO$_3$M (M : Na, K, etc.) (Japanese Pat. Publication No. 12,146/71).

(IV) (R$_2$N)$_3$P or (R$_3$N)$_3$P = O (Japanese Patent Publication No. 22,399/70 and Japanese Patent Publication No. 26,630/68).

Other known randomizers and molecular weight regulators than those mentioned above may be used in the present process in combination with said polymerization initiators.

As the polymerization temperature, there is ordinarily used a temperature of 10° to 150° C., and preferably 20° to 100° C. The polymerization pressure may be any pressure that is sufficient to keep the reaction mixture in a liquid state, and ordinarily, a pressure of about 1 to 5 atm., is used, though the reaction may be conducted under higher or lower pressures in special cases.

The polymerization is preferably conducted under an atmosphere of an inert gas, such as nitrogen or argon.

The polymerization is effected by contacting a conjugated diolefin or a mixture of a conjugated diolefin and a vinyl aromatic hydrocarbon with a lithium-type initiator in a hydrocarbon solvent. The method of adding the lithium-type initiator is as follows: The quantity of lithium-type initiator is divided into two portions, A and B, in a molar ratio of A : B = 1 : 3 to 15, and the A portion of the lithium-type initiator is at first added to the polymerization system. The optimum concentration of the active lithium at this stage is 0.001 to 1.0 millimole per 100 gr. of monomer. In the presence of the A portion of the lithium-type initiator, polymerization is effected until the conversion reaches 20 to 60 percent by weight, when the B portion of the lithium-type initiator is added. The optimum concentration of the active lithium of the B portion is 0.01 to 10 millimoles per 100 gr. of monomer. The B portion of the lithium-type initiator may be further divided into two or more portions and added portionwise. After the addition of the B portion at the latter stage, the polymerization is allowed to proceed until the substantial completion of the reaction, ordinarily until a conversion of more than 80 percent is reached. Said A and B portions may be added to the reaction system either continuously or batchwise. In the present process, the molar ratio of the A portion to the B portion and the conversion range in which the B portion should be added, are limited to the ranges given above, because when the conversion at which the B portion should be added is more than 60 percent or when the molar ratio of the A portion to the B portion is 1 : less than 3, there cannot be obtained a polymer having improved cold flow. Further, when the conversion at which the B portion should be added is less than 20 percent or when the molar ratio of the A portion to the B portion is 1 : more than 15, the cold flow can be improved but there cannot be obtained a polymer having various properties required for conventional rubbers, for example, tensile strength, processability and the like. The temperature and pressure at which the A and B portions are added are preferably near the polymerization temperature and pressure, though not critical. When a randomizer or a molecular weight regulator is used, it may be added together with the A or B portion of a lithium-type initiator, or may be added independently. In the case where polymerization is not immediately started upon the addition of the A portion owing to the presence of impurities in the monomer, the polymerization may be started by adding an excess of the lithium-type initiator. The excess lithium-type initiator is not included in the above-mentioned amount of the A and B portions.

When the reaction has been substantially completed, an anti-oxidant and a terminator, such as water, alcohols or the like, are added in a conventional manner to terminate the polymerization, and the resulting polymer is separated, washed, and dried to obtain the desired product.

The polymerization of the present invention may be effected not only batchwise but also continuously with satisfactory results.

The present invention is specifically explained below by referring to the following examples which, however, are by way of illustration and not by way of limitation.

The cold flow given in the examples was determined by extruding the polymer through a one-fourth inch orifice at 50° C. at a pressure of 3.5 lbs/in². In order to obtain the steady state, the polymer was allowed to be extruded for 10 min., after which the rate of extrusion was measured and expressed in milligrams per minute.

The Mooney viscosity ($ML_{1+4}$) was measured at 105° C. by means of Goodrich Mooney viscosimeter.

EXAMPLE 1

Table 1

| Run No. | 1 | 2 | 3 | 4 |
| --- | --- | --- | --- | --- |
| Monomer | Butadiene | Butadiene | Isoprene | Isoprene |
| Ratio of divided catalyst | 1:0 | 1:5 | 1:0 | 1:5 |
| Catalyst used (total) (mhm) | 0.48 | 0.48 | 0.48 | 0.48 |
| Firstly added (mhm) | 0.48 | 0.08 | 0.48 | 0.08 |
| Secondly added (mhm) | – | 0.40 | – | 0.40 |
| Conversion to polymer (%) | – | 35 | – | 35 |
| Reaction temperature (°C.) | 40 | 40 | 40 | 40 |
| Reaction period (min.) | 300 | 300 | 300 | 300 |
| Ultimate conversion (%) | 97 | 100 | 95 | 97 |
| Cold flow (mgr./min.) | 17.0 | 3.8 | 6.4 | 2.0 |

Note: (1) 500 Parts by weight of benzene as solvent was used per 100 parts by weight of monomer.
(2) mhm : millimoles per 100 gr. of monomer.

Butadiene and isoprene were polymerized under the conditions as shown in Table 1. Run Nos. 1 and 3 are comparative examples, which are not included within the scope of the invention. The procedure of polymerization was as follows: The dried and purified solvent and the monomer were introduced into a polymerization vessel which had been thoroughly dried and flushed with argon gas, and the vessel was heated to the reaction temperature. Then a small quantity of a solution of n-butyllithium was added to the vessel to remove any impurity present in the system. Subsequently, a predetermined quantity of the catalyst, i.e., n-butyllithium, was added to the system to initiate polymerization. In Run Nos. 2 and 4, the quantity of the catalyst was divided in a molar ratio of 1 : 5, and one-sixth of the total quantity was firstly added to initiate the polymerization and the remaining five-sixths was added when the conversion had reached 40 percent, to continue the polymerization. After the polymerization had been carried out for a predetermined period, a small amount of isopropyl alcohol was added to the system to terminate the polymerization. The polymer solution was poured into a large amount of isopropyl alcohol with stirring to coagulate the polymer, and the resulting polymer was dried under vacuum for 15 hours at 50° C.

The values of cold flow of the polymers were as shown in the last line in Table 1. By comparing the values of Run Nos. 1 and 3 with those of Run Nos. 2 and 4, the advantage of using the catalyst in divided portions is evident.

EXAMPLE 2

The copolymerization of butadiene with styrene was carried out under the conditions as shown in Table 2. Run Nos. 5 and 6 were shown as comparative examples, which are not included within the scope of the invention. The procedure of polymerization was as follows: The dried and purified solvent and the monomer were introduced into a polymerization vessel which had been thoroughly dried and flushed with argon gas, and the vessel was heated to the reaction temperature. Then a small quantity of a solution of n-butyllithium was added to the vessel to remove any impurity present in the system. Subsequently, a predetermined quantity of potassium dodecylbenzenesulfonate (as a benzene solution of 0.05 mole/l.) as a randomizer and a predetermined quantity of n-butyllithium as the catalyst were added to initiate polymerization

TABLE 2

| Run number | 5 | 6 | 7 | 8 | 9 | 10 | 11 | 12 | 13 |
| --- | --- | --- | --- | --- | --- | --- | --- | --- | --- |
| Solvent | Heptane | Benzene | Benzene | Heptane | Heptane | Cyclohexane | Heptane | Heptane | Heptane |
| Randomizer (mhm.) | 0.05 | 0.02 | 0.02 | 0.05 | 0.08 | 0.10 | 0.05 | 0.10 | 0.10 |
| Ratio of divided catalyst | 1:0 | 1:2 | 1:3 | 1:4 | 1:5 | 1:7 | 1:9 | 1:10 | 1:12 |
| Catalyst used (total) (mhm.) | 0.50 | 0.60 | 0.60 | 0.60 | 0.62 | 0.67 | 0.60 | 0.70 | 0.70 |
| Firstly added (mhm.) | 0.50 | 0.20 | 0.15 | 0.12 | 0.11 | 0.08 | 0.06 | 0.064 | 0.054 |
| Secondly added (mhm.) | | 0.40 | 0.22 | 0.12 | 0.51 | 0.59 | 0.14 | 0.33 | 0.646 |
| Conversion to polymer (percent) | | 40 | 40 | 20–52 | 40 | | 50 | 20–40 | 34 | 30 |
| Thirdly added (mhm.) | | | 0.23 | 0.36 | | | 0.40 | 0.306 | |

TABLE 2 — Continued

| Run number | 5 | 6 | 7 | 8 | 9 | 10 | 11 | 12 | 13 |
|---|---|---|---|---|---|---|---|---|---|
| Conversion to polymer (percent) | | | 55 | 52 | | | 40 | 54 | |
| Reaction temperature (°C.) | 50 | 50 | 45 | 55 | 55 | 55 | 55 | 50 | 55 |
| Reaction period (min.) | 130 | 200 | 220 | 280 | 290 | 210 | 160 | 320 | 300 |
| Ultimate conversion (percent) | 80 | 95 | 95 | 96 | 100 | 100 | 93 | 98 | 90 |
| Mooney viscosity | 52 | 55 | 48 | 51 | 35 | 48 | 51 | 40 | 43 |
| Cold flow (mgr./min.) | 9.0 | 7.5 | 1.5 | 2.4 | 0.6 | 0.4 | 2.6 | 1.3 | 3.0 |

NOTE.—3,000 gr. of the solvent was used per 600 gr. of monomer (150 gr. of styrene and 450 gr. of butadiene).

In Run No. 5, the catalyst was added not in portions but as a whole at the outset. In Run Nos. 6, 9, 10 and 13, a portion of the catalyst was added at the outset of polymerization and the remainder was added when the conversion reached 30 to 50 percent. In Run Nos. 7 and 12, one of three portions of the catalyst was added at the outset, and the remaining two portions were added at a conversion of 34 to 40 percent, and at a conversion of 54 to 55 percent. In Run Nos. 8 and 11, the first portion of the catalyst was added at the outset, the second portion was added continuously while the conversion increases from 20 to 52 percent or from 20 to 40 percent, respectively, and the remainder was added at a conversion of 52 or 40 percent, respectively.

After the polymerization had been carried out for a predetermined period, a small amount of isopropyl alcohol was added to terminate the polymerization. Two parts by weight of an antioxidant was added for 100 parts by weight of the polymer in solution, and then the solvent was removed by blowing steam into the solution with stirring, to obtain the polymer which was then formed into a sheet on a mixing mill and dried.

Run Nos. 1 and 3 in Example 1 and Run Nos. 5 and 6 in Example 2 are comparative examples for comparison. By comparing these comparative examples with Examples of the present process, it is evident that the cold flow characteristic of the polymer obtained by the present process is remarkably improved.

What we claim is:

1. A process for producing a homopolymer or a copolymer of conjugated diolefin by polymerizing a conjugated diolefin alone or in admixture with a vinyl aromatic hydrocarbon in the presence of an initiator selected from the group consisting of metallic lithium and an organic lithium compound in a hydrocarbon solvent, characterized in that the quantity of said initiator required for the polymerization is divided into two portions, A and B, in a molar ratio of A : B = 1 : 3 to 15, and the A portion of the initiator is added to the polymerization system at the outset to initiate the polymerization, and when the conversion reaches 20 to 60% by weight, the B portion of the initiator is added to said system without deactivating the active species initiated by the A portion of initiator, and thereafter, the polymerization is carried out until it is substantially completed, the concentration of active lithium of the A portion being 0.001 to 1.0 millimole per 100 gr. of the monomer and the concentration of active lithium of the B portion being 0.01 to 10 millimoles per 100 gr. of the monomer.

2. A process according to claim 1, wherein the molar ratio of the A portion to the B portion iw is 1 : 3 to 12.

3. A process according to claim 1, wherein the polymerization temperature is from 10° to 150°C.

4. A process according to claim 1, wherein the polymerization pressure is from 1 to 5 atms.

5. A process according to claim 1, wherein the polymerization is carried out under an atmosphere of an inert gas.

6. A process according to claim 1, wherein the conjugated diolefin is 1,3-butadiene, isoprene, or piperylene.

7. A process according to claim 1, wherein the vinyl aromatic hydrocarbon is styrene, divinylbenzene, α-methylstyrene, β-methylstyrene, vinyltoluene, 1-vinylnaphthalene, or 2-vinylnaphthalene.

8. A process according to claim 1, wherein butadiene or isoprene is homopolymerized.

9. A process according to claim 1, wherein butadiene or isoprene is copolymerized with styrene.

10. A process according to claim 1, wherein butadiene and isoprene are copolymerized, or butadiene, isoprene and styrene are copolymerized.

11. A process according to claim 1, wherein the hydrocarbon solvent is propane, n-pentane, isopentane, n-hexane, n-heptane, n-octane, isooctane, n-decane, cyclopentane, cyclohexane, methylcyclopentane, ethylcyclohexane, benzene, toluene, or xylene.

12. A process according to claim 1, wherein the initiator is metallic lithium, an alkyllithium, an aryllithium, an alkenyllithium, an alkylenedilithium, an arylene-dilithium, 1,3,5-trilithiocyclohexane, 1,2,5-trilithionaphthalene, 1,3,5,8-tetralithiodecane, or 1,2,3,5-tetralithio-4-hexylanthracene.

13. A process according to claim 1, wherein the initiator is n-butyllithium.

* * * * *